United States Patent [19]

Kerpan et al.

[11] Patent Number: 5,405,120
[45] Date of Patent: Apr. 11, 1995

[54] AIRCRAFT FUELING NOZZLE

[75] Inventors: Stephen J. Kerpan, La Habra; Basil Tilling, Mission Viejo; Gary F. McKee, Newport Beach, all of Calif.

[73] Assignee: Whittaker Controls, Inc., North Hollywood, Calif.

[21] Appl. No.: 59,828

[22] Filed: May 7, 1993

[51] Int. Cl.⁶ .............................................. F16L 37/28
[52] U.S. Cl. .................................. 251/149.9; 251/143
[58] Field of Search ............................. 251/143, 149.9; 137/540, 614.06

[56] References Cited

U.S. PATENT DOCUMENTS

| | | | |
|---|---|---|---|
| 3,143,137 | 8/1964 | Muller | 251/149.9 X |
| 3,216,744 | 11/1965 | Elbogen et al. | 251/149.9 X |
| 3,479,005 | 11/1969 | Graaf | 251/149.9 |
| 3,605,788 | 9/1971 | Brown | 137/220 |
| 4,030,524 | 6/1977 | McMath et al. | 137/614.06 |
| 4,133,551 | 1/1979 | Knight et al. | 137/614.06 |
| 4,359,066 | 11/1982 | Hunt | 251/149.9 X |
| 4,567,924 | 2/1986 | Brown | 141/207 |

FOREIGN PATENT DOCUMENTS 1046060  9/1965  United Kingdom .............. 251/149.9

OTHER PUBLICATIONS

U.S. Military Standard 24484 covering Pressure Fuel Servicing Adapter (fueling flange), Feb. 15, 1983.
Photocopy of promotional material for Fueling Nozzle by Avery Hardoll Aviation Equipment, publication date unknown.

Primary Examiner—Martin P. Schwadron
Assistant Examiner—Kevin L. Lee
Attorney, Agent, or Firm—Christie, Parker & Hale

[57] ABSTRACT

An aircraft fueling nozzle has a body with a bearing sleeve mounted within the body. The nozzle has a poppet having a stem which is guided by the bearing sleeve. A seat is mounted in the nozzle body for forming a seal with the poppet head. The seat is retained in the body by a resilient lip which encompasses the seat projecting outward and interacts with an inwardly projecting lip on the body. The nozzle has a linkage for moving the poppet including an actuator located upstream of the bearing sleeve which is connected to an arm which overarches the bearing sleeve and is connected to the poppet. The actuator includes a crank which is connected to the arm and an actuator shaft which connects to the crank by interfitting splines. The nozzle further includes a swivel for rotatably coupling the nozzle body to a fuel supply. The swivel includes a replaceable annular bearing ring. The nozzle includes recesses for receiving the lugs of an aircraft fueling flange to secure the flange to the nozzle.

20 Claims, 8 Drawing Sheets

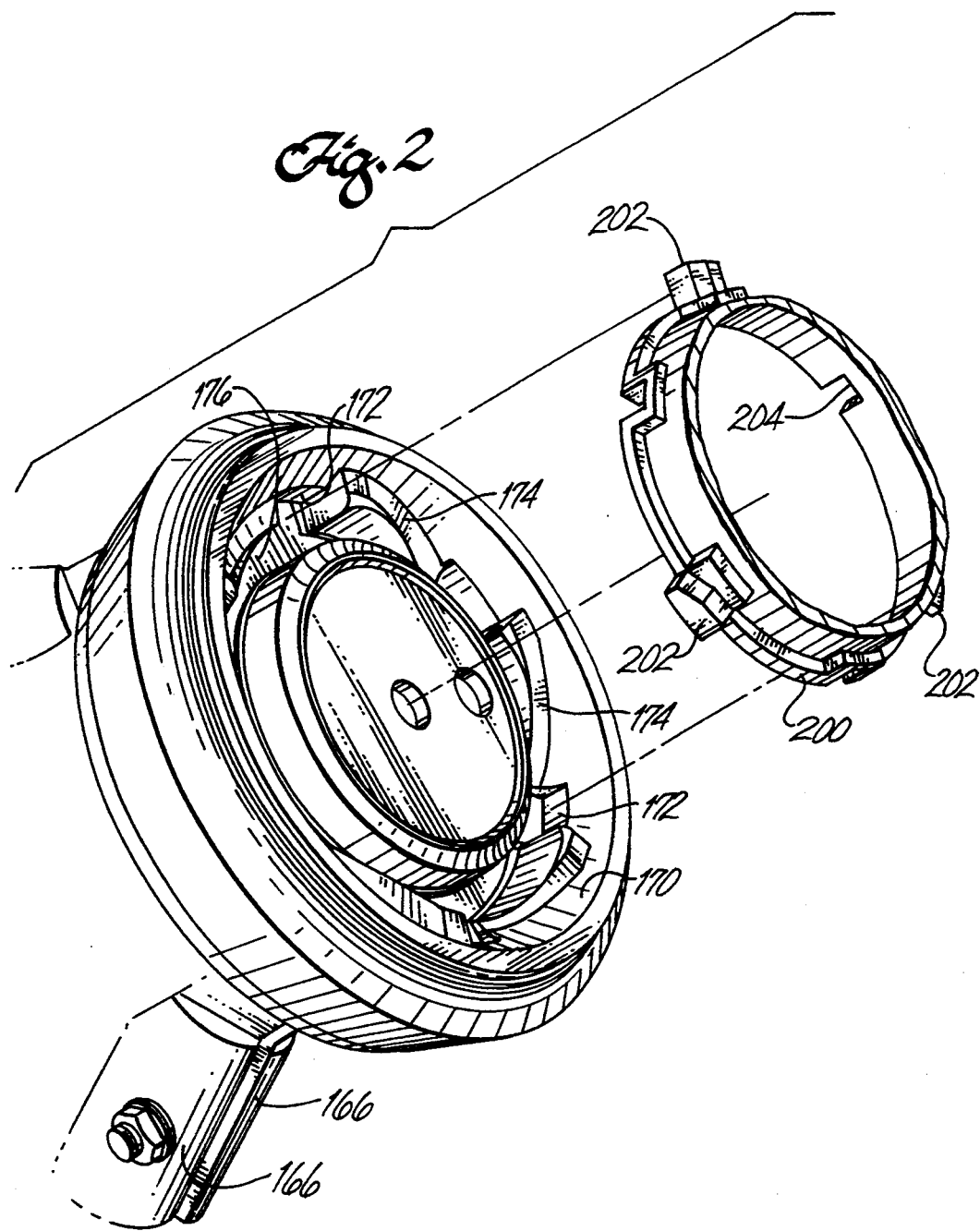

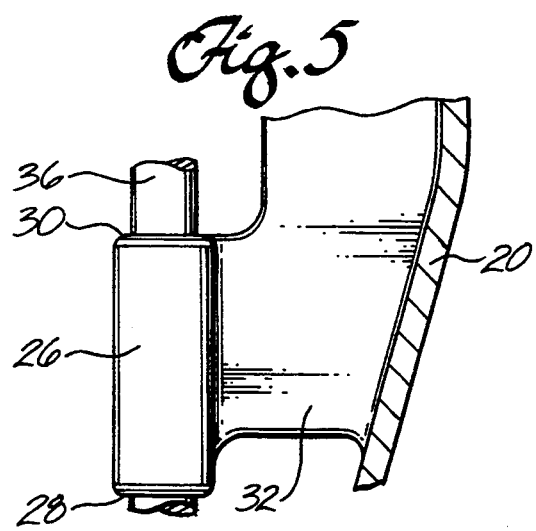
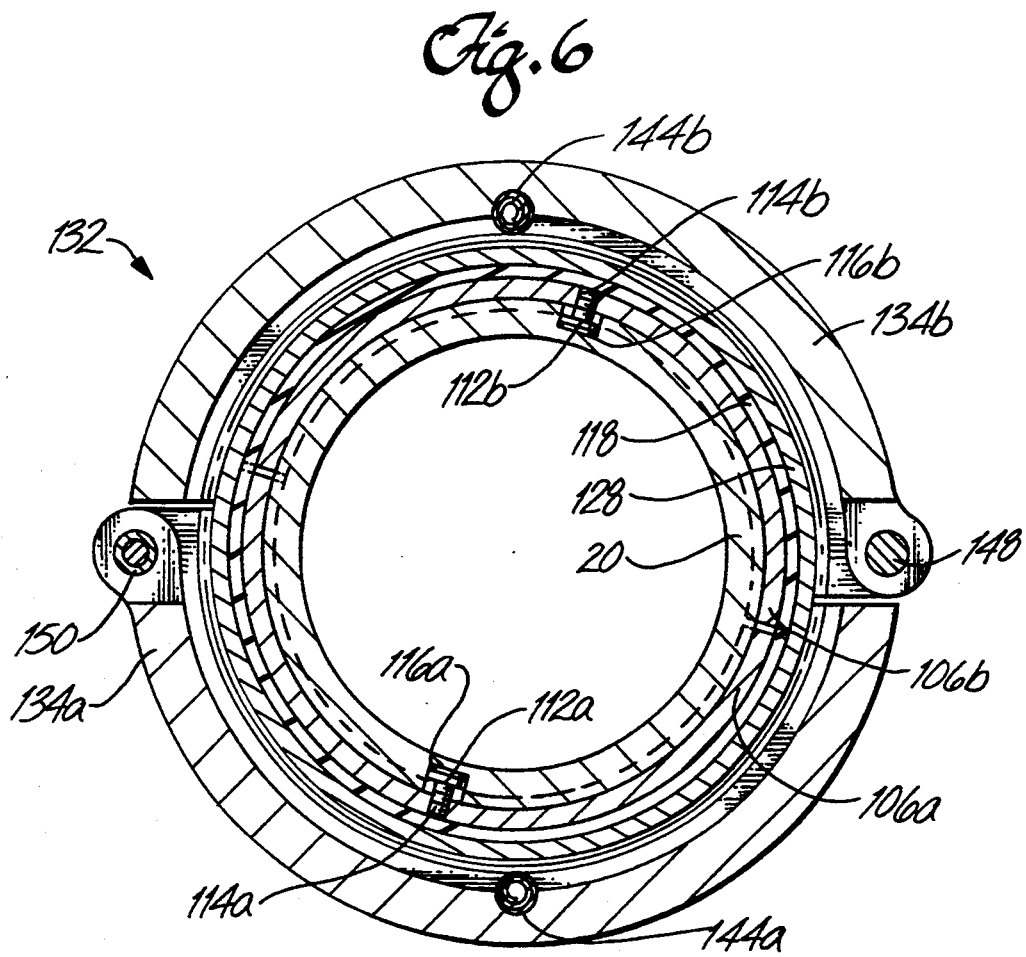

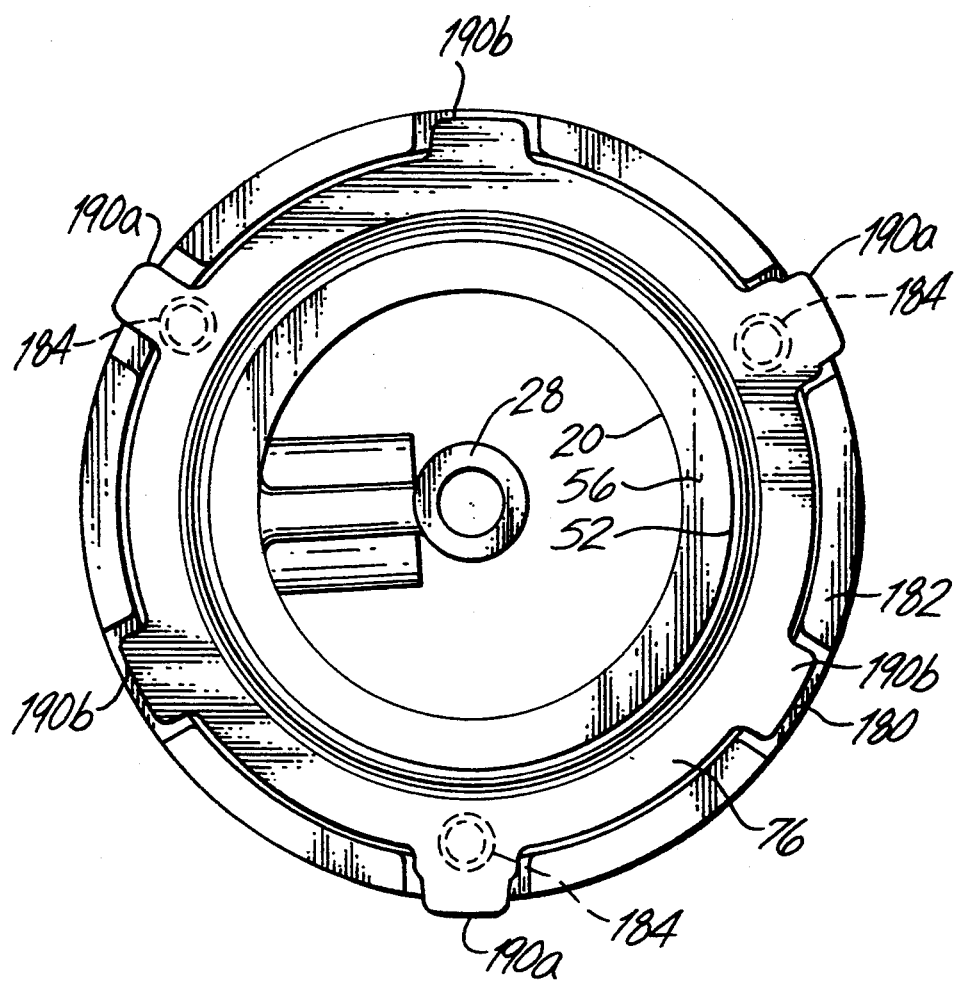

AIRCRAFT FUELING NOZZLE

BACKGROUND OF THE INVENTION

The invention pertains to a nozzle for use in aircraft fueling. More particularly, it pertains to the construction of a fueling nozzle which is rugged, compact, lightweight and easy to repair.

A typical aircraft fueling nozzle has a poppet type fluid control valve. The valve is adapted at an outlet end for connection to a fueling flange on an aircraft, and at an inlet end for connection to a fuel supply hose. The poppet has a head and a stem which rides in and is guided by a bearing sleeve that is attached to the valve body via one or more webs. The valve is actuated via a linkage comprising an arm rotatably connected to the valve stem, a crank rotatably connected to the arm and means for actuating the crank, such as a hand operated lever connected to the crank via a shaft.

In one common design, a single crank is used with two arms, one at either side of the crank and valve stem. The arms are connected to the crank via an axle pin and connected to the stem via a second axle pin extending through the stem. With the crank disposed adjacent the inlet end of the nozzle body, the arms extend downstream, toward the outlet end, where they are connected to an end of the valve stem upstream of the bearing sleeve. The valve stem extends through the bearing sleeve with the poppet head mounted at an end of the valve stem downstream of the bearing sleeve. The resulting nozzle is of such length as is necessary to accommodate the linkage, an area of the valve stem upstream of the bearing sleeve, the bearing sleeve itself and the poppet head. Enough length of stem must exist upstream of the bearing sleeve to give the valve a sufficient range of motion without the arm interfering with the bearing sleeve. Nozzles according to such construction have been criticized for high weight and difficulty in handling, resulting from the length of the nozzle.

To address such concerns, U.S. Pat. No. 4,567,924 to Albert W. Brown, discloses a nozzle which has a slot formed in the bearing sleeve and extending from the upstream end thereof. A corresponding slot is formed in the valve stem. The nozzle uses a single arm which extends into the slot in the valve stem, and is rotatably connected thereto by a pin which extends through the stem. When the linkage moves the valve, the arm can pass through the slot in the bearing sleeve. Accordingly, the necessary length of the nozzle is reduced.

In the Brown fueling nozzle, the crank is attached to the shaft via four bolts. To access the bolts for removing the crank, one must carefully insert a driver through the nozzle accessory port and one by one remove the bolts. Furthermore, to subsequently remove the stem and linkage, the poppet head must be removed from the stem, such as by removal of a cotter pin which extends through the head and the downstream end of the stem. Subsequently the stem and linkage may be extracted through the inlet port.

In the two-armed design, such as is used in a prior nozzle manufactured by the assignee of the applicant, the actuator shaft extends all the way through the housing. The crank is secured to the shaft via hexagonal interlocking features formed respectively on the shaft and on a shaft receiving bore through the crank. The arms are secured to the crank and also secured to the upstream end of the stem via axle pins having a head at one end of each pin and a cotter pin at the other end of each pin. The actuating lever is located at one end of the shaft and a cotter pin is inserted through the other end of the shaft. To remove the shaft, the cotter pin is removed and the shaft is extracted from the body and crank. Subsequently, as with the Brown nozzle, the linkage may be removed after separating the poppet head from the stem, with the head cotter pin being accessible when the poppet is in an open orientation.

In the prior product manufactured by the assignee of the applicant, the valve seat is supported and biased toward the head via an annular wave spring. To retain the seat in the nozzle when the poppet is in the open position, a retainer clip is provided to secure the nozzle to the body. The retainer clip has two outwardly projecting annular lips. The seat has an inwardly projecting annular lip as does the nozzle body. The clip is placed over the inwardly projecting annular lips so that the lips of the seat and the body are held between the lips of the clip with the lip of seat being downstream of the lip of the body. With the valve closed, the wave spring is compressed and the retainer clip does not engage the lips of the seat and body. However, as the valve is opened the seat gradually moves downstream with the valve until the seat lip engages the downstream retainer clip lip and the body lip engages the upstream retainer clip lip to restrict further movement. In order to replace the seat, the poppet head must be removed from the stem permitting access to the retainer clip which is removed using a special tool. With the clip removed the seat may be extracted by hand.

In the prior product manufactured by the assignee of the applicant, the nozzle has a connector for mating with a fueling flange of an aircraft. The fueling flange has an annular rim with three radially outwardly projecting lugs and three slots intermediate the lugs. The connector has three ramps interspaced with three slots which are configured to receive the fueling flange lugs. When the nozzle is mated with the fueling flange, the lugs pass through the slots as the flange depresses a spring-loaded lock plate. The flange is secured to the nozzle against rotation by pins which are attached to the nozzle body and extend into the slots on the fueling flange. When the lock plate is depressed, the connector may be rotated so that the lugs are secured beneath the ramps thereby firmly connecting the flange to the nozzle.

SUMMARY OF THE INVENTION

According to one feature of the invention, an aircraft fueling nozzle has a body with a bearing sleeve mounted within the body. The nozzle has a poppet having a stem which is guided by the bearing sleeve. A seat is mounted in the nozzle body for forming a seal with the poppet head. The nozzle has a linkage for moving the poppet. The linkage includes an actuator located upstream of the bearing sleeve which is connected to an arm which overarches the bearing sleeve and connects to the poppet downstream of the bearing sleeve. This feature allows for a relatively compact, lightweight and easy to service nozzle and permits the use of a lightweight unitary poppet.

According to another feature of the invention, the seat is retained in the body by a resilient lip which encompasses the seat projecting outward and interacts with an inwardly projecting lip on the body. This permits the seat to be snapped out of the nozzle body for service or replacement.

According to another feature of the invention, the actuator includes a crank which is rotatably connected to the arm and an actuator shaft which is connected to the crank by interfitting splines. This facilitates assembly and service of the actuator.

According to another feature of the invention, the nozzle further includes a swivel for rotatably coupling the nozzle body to a fuel supply. The swivel includes a replaceable annular bearing ring. The bearing ring may be made of a material chosen for durability and facilitates easy repair of the nozzle when the bearing ring eventually wears out.

According to another feature of the invention, the nozzle further includes a plurality of recesses for receiving the lugs of an aircraft fueling flange and for coupling the flange to the nozzle against relative rotation.

BRIEF DESCRIPTION OF THE DRAWINGS

The features of a specific embodiment of the best mode contemplated of carrying out the invention is illustrated in the drawings, in which:

FIG. 2 is a perspective view of the downstream end of the nozzle of FIG. 1, shown in relation to a fueling flange of an aircraft;

FIG. 5 is an elevational view of the bearing sleeve and web of the nozzle of FIG. 1 taken along line 5—5 of FIG. 1;

FIG. 6 is a cross-sectional view of the swivel section of the nozzle of FIG. 1 taken along line 6—6 of FIG. 1;

FIG. 7 is an elevational view of the downstream end of the nozzle body and lock plate of FIG. 1;

DETAILED DESCRIPTION

Figure 1:
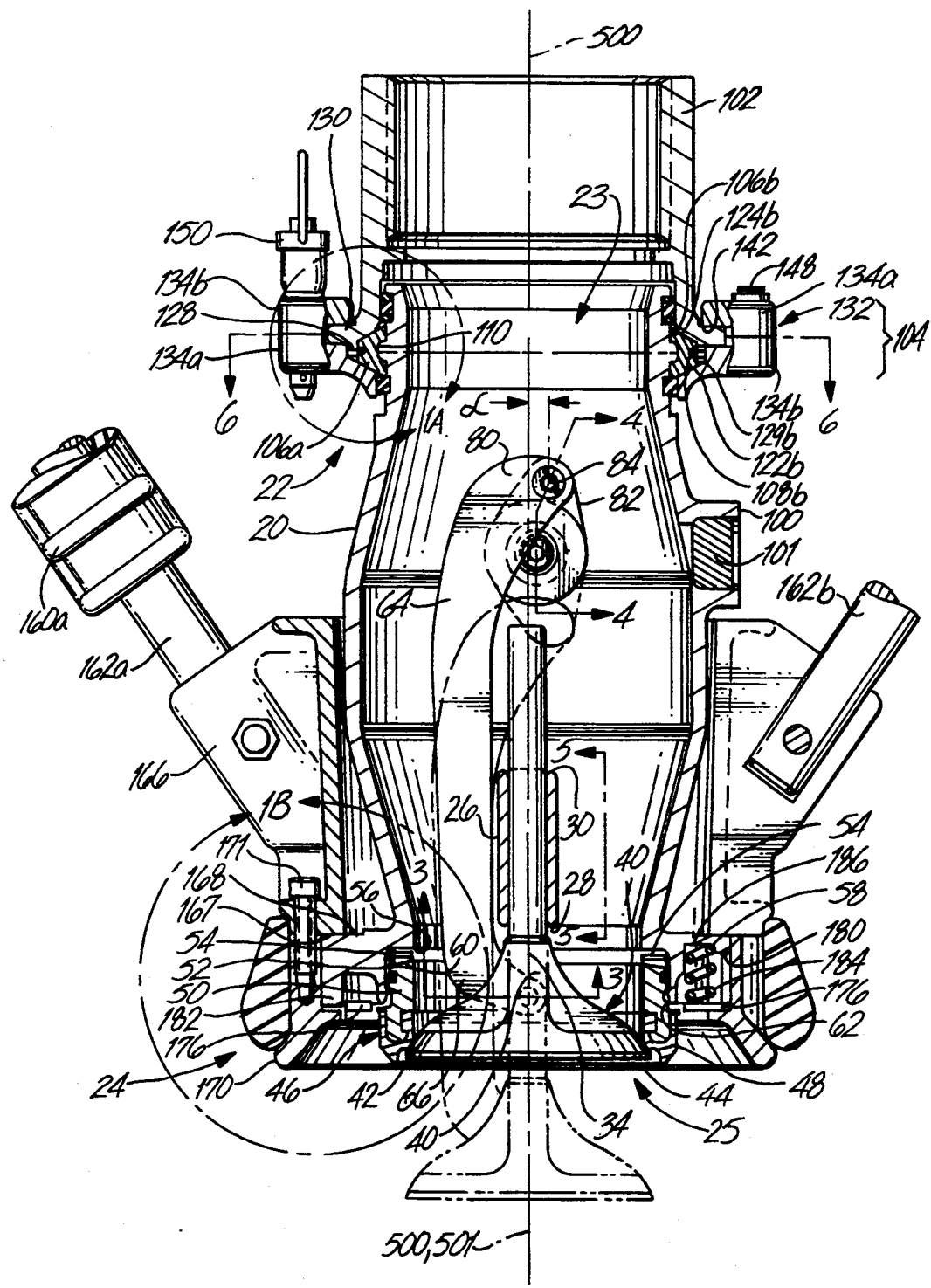
FIG. 1 is a side cross-sectional view of a fueling nozzle incorporating principles of the invention, shown partially in cross-section.

As shown in FIG. 1, a fueling nozzle has a body 20 with an upstream end 22 and a downstream end 24 which bound an inlet port 23 and an outlet port 25 respectively. The body is preferably formed of cast aluminum. A flow passage with a flow axis 500 is defined between the inlet and outlet ports.

A bearing sleeve 26 having downstream and upstream ends 28 and 30, respectively, is mounted along the flow axis within the body by a web 32 which extends radially inward from the body to the bearing sleeve (FIG. 5). An aluminum poppet 34 has a substantially cylindrical stem 36 and a head 40. The stem extends into the bearing sleeve with the downstream end of the bearing sleeve facing the poppet head. The stem is aligned with a stem axis 501 which is coincident with the flow axis. The poppet head is aligned with the stem axis and has a poppet seal face 42 which substantially faces upstream, and a downstream surface 44 which faces away from the stem.

Figure 1A:
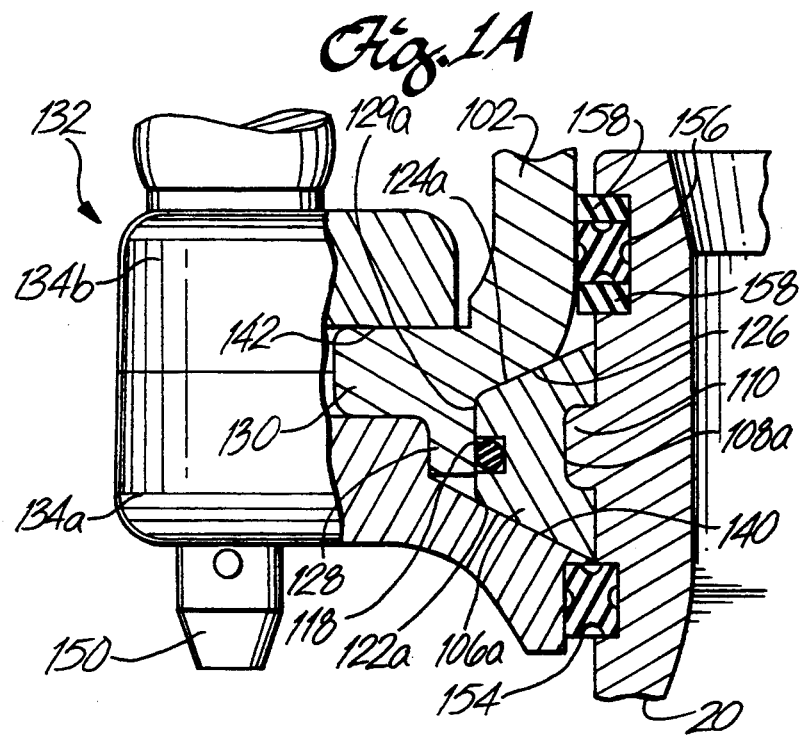
FIG. 1a is an enlarged cross-sectional view of a portion of the swivel section of the nozzle of FIG. 1.
Figure 1B:
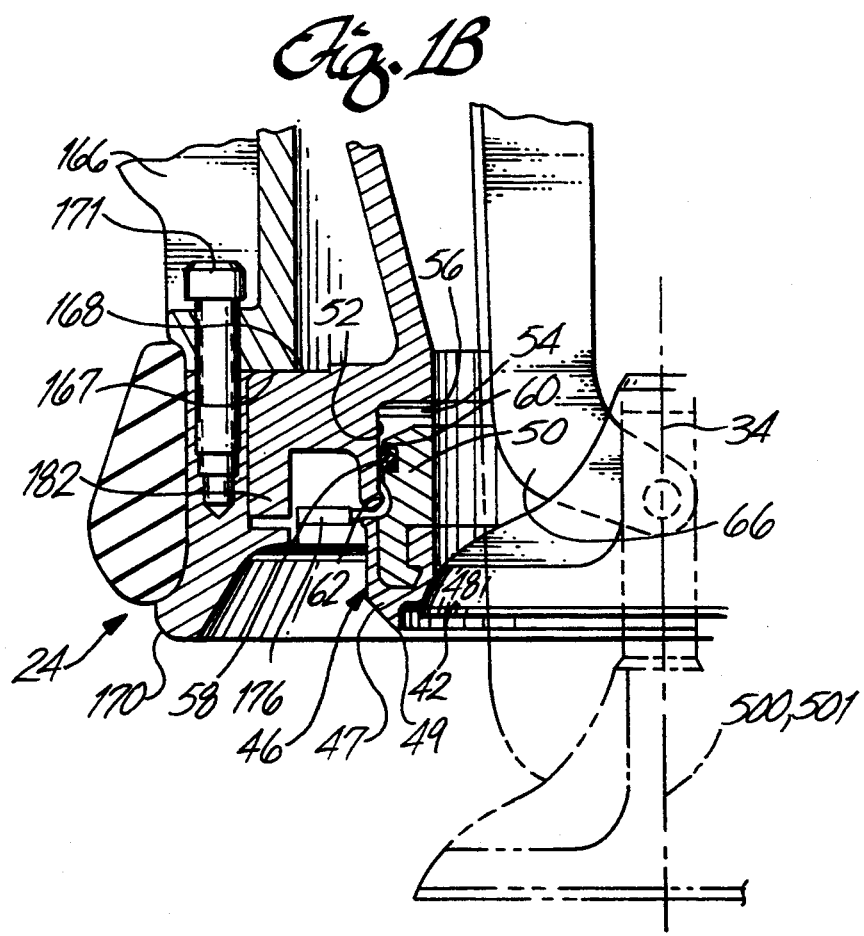
FIG. 1b is an enlarged cross-sectional view of a portion of the downstream end of the nozzle of FIG. 1.

As further shown in FIG. 1b, a seat 46 has an annular elastomeric nose seal 47 with a seat surface 48, a nose lip 49 and a rigid core support 50. The seal is preferably formed of polyurethane, and the support is preferably formed of aluminum. The seat is mounted in an annular bore 52 of the nozzle body adjacent the downstream end thereof. The seal seat is engagable with the poppet to form a seal with the poppet face. An annular steel wave spring 54 is positioned between the support 50 and an annular shoulder 56 which forms a base of the bore 52. The seat is movable along the flow axis and is biased in a downstream direction by the wave spring 54. A nitrile rubber O-ring 58 is positioned in an outwardly facing annular recess 60 formed in the support 50. The O-ring 58 forms a seal with the surface of annular bore 52. An annular lip 62 projects radially inward from the annular bore 52. The lip is located downstream of the O-ring. In addition to its sealing function, the O-ring serves as a resilient annular lip projecting radially outward from the seat. Accordingly, if the wave spring biases the O-ring into contact with the lip 62, the O-ring and the lip 62 cooperate to restrict the downstream movement of the seat.

The poppet is movable along the stem axis between a closed position shown in solid lines in FIG. 1 and an open position shown in phantom in FIG. 1. In the closed position the poppet seal face engages and seals with the nose seal seat surface so that no fluid may pass through the nozzle. In the open position, the head is free of the seat so as to allow fuel to pass from the nozzle to an aircraft.

Figure 3:
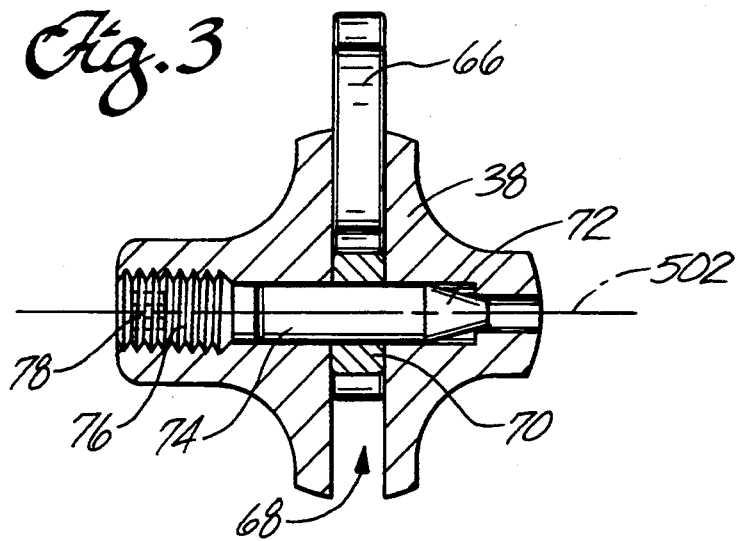
FIG. 3 is a cross-sectional view of the poppet head taken of the nozzle of FIG. 1 along line 3—3 of FIG. 1.

The poppet is movable along the stem axis via a linkage including an arm 64 which overarches the bearing sleeve 26. The arm is formed of stainless steel and has a downstream end 66 which is received by a pocket 68, formed in the poppet head 38 (FIG. 3). A stainless steel pivot pin 72 is positioned in the cavity in the poppet head for rotatably coupling the arm to the head about a coupling axis 502 located between the downstream surface of the head and the bearing sleeve. The pin has an axle section 74 for positioning the arm relative to head and a threaded section 76 for securing the pin to the head. The threaded section can comprise a set screw having a socket head 78. The coupling axis; is perpendicular to, and intersects the stem axis. The axle pin may be formed unitarily, or, in two parts, with the axle section and threaded section as separate pieces.

Figure 4:
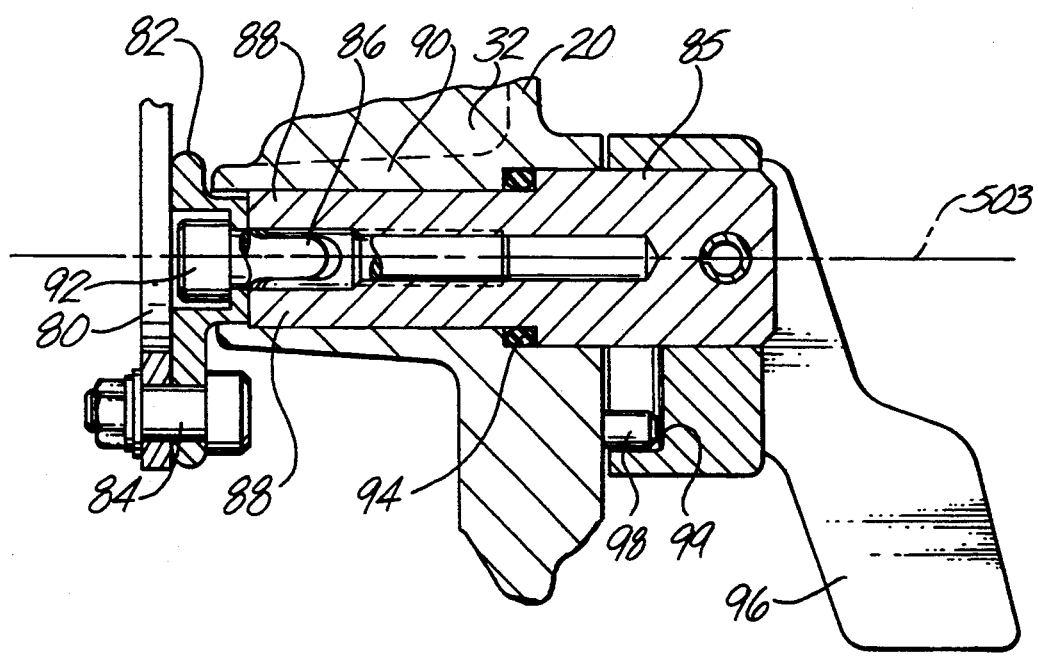
FIG. 4 is a cross-sectional view of the valve actuator of the nozzle of FIG. 1 taken along line 4—4 of FIG. 1.
Figure 8:
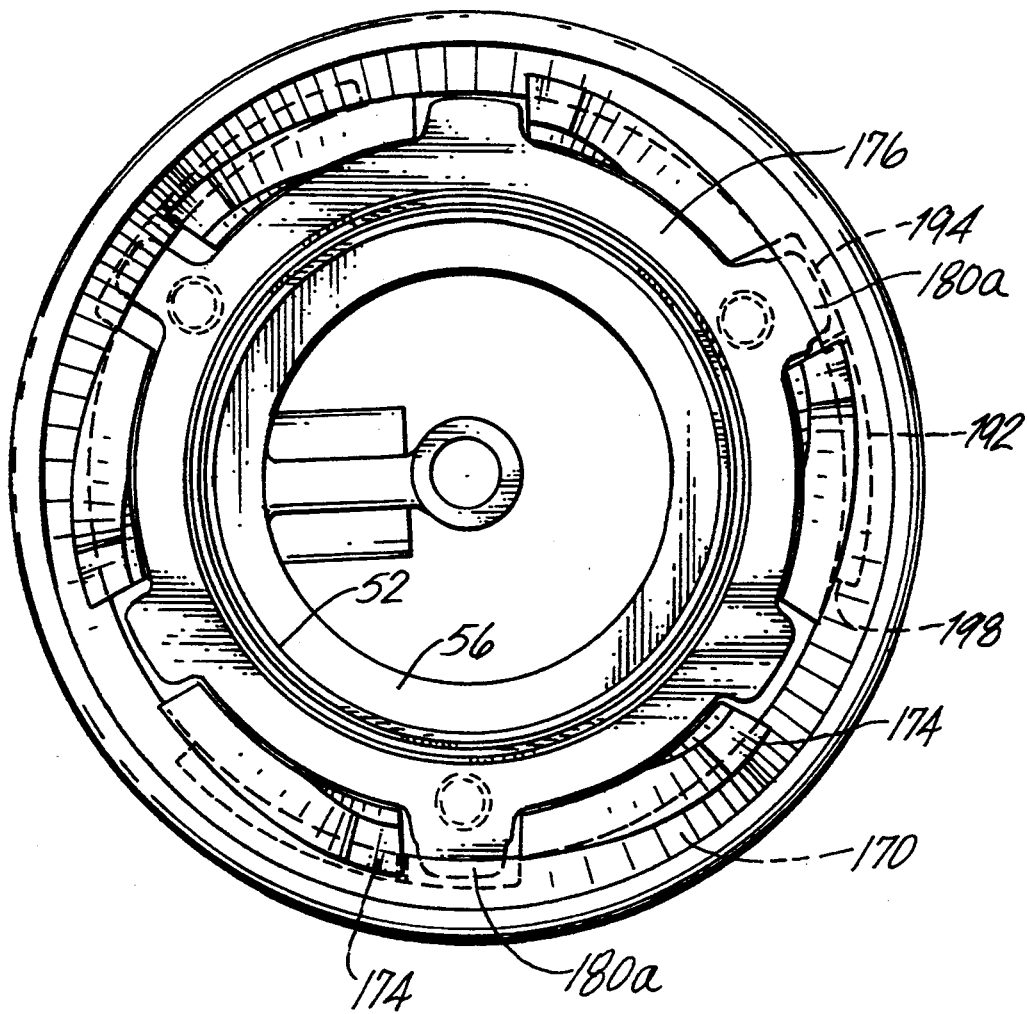
FIG. 8 is an elevational view of the downstream end of the nozzle body, lock plate and connector of the nozzle of FIG. 1.
Figure 9:
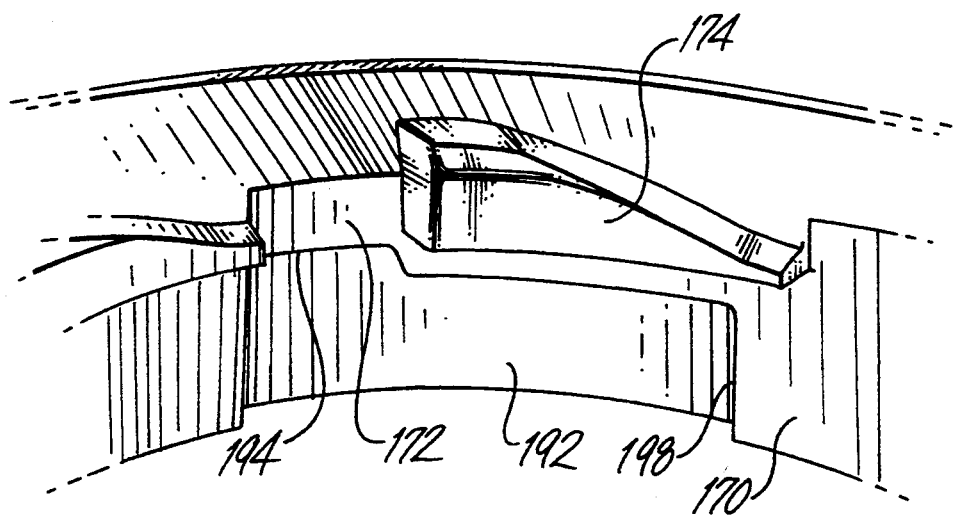
FIG. 9 is a partial perspective view of the connector of the nozzle of FIG. 1.

As shown in FIG. 4, the arm has an upstream end 80 which is rotatably coupled to a crank 82 via an axle bolt 84. An actuator shaft 85 extends through the nozzle body wall 20 and is rotatably supported in a sleeve 90, formed in the nozzle body. The crank has two splines 86, which interfit with and engage two splines 88 formed on the actuator shaft. The splines 86 and 88 are disposed about a shaft axis 503. The crank is preferably formed of cast stainless steel and the shaft is preferably formed of stainless steel. A socket head retaining screw 92 fastens the crank to the shaft so as to maintain engagement between the crank splines and the shaft splines. The actuator shaft is sealed to the body via rubber O-ring 94. A lever 96 is connected to the shaft for rotating the shaft about the shaft axis. The actuator shaft is located in a wide section of the nozzle body having a greater diameter than adjacent the body ends.

This permits clearance between the upstream end of the arm and the body as the actuator shaft and crank rotate the arm away from the flow axis.

In the closed position, the crank is oriented with the axle bolt upstream of the shaft axis, as shown in solid lines in FIG. 1. In this orientation, the axle bolt is in an over-center position characterized by a spacing $a$ between the axle bolt axis and the flow axis. In this orientation, the poppet head is locked in place against unwanted movement. Any downstream directed force as exerted by pressure on the poppet from fuel in the nozzle will not be able to push the head downstream as the induced direction of shaft rotation is prevented by a stop pin 98 bearing against an end of a lever slot 99 to determine the maximum rotation of the lever.

The lever is used to rotate the crank arm and poppet into an open position shown in phantom in FIG. 1 with the axle bolt located downstream of the actuating axis. In this position, the axle bolt will also be over-center, so that any upstream directed force on the poppet head, such as from a spring loaded poppet valve on an aircraft fueling flange, will not be able to close the nozzle. As the poppet is moved from the closed to open positions, initially the seat will maintain a seal with the poppet face as the seat moves downstream with the valve under load from the wave spring 54. The seal between the seat and the poppet face begins to break as the downstream movement of the seat is limited by contact of the nose lip with an aircraft fueling flange seat (not shown), while the head continues to move downstream until it reaches the fully opened position.

Shown rotated 90° about the flow axis in FIG. 1 for purpose of illustration, a port 100 is sealed by a removable threaded plug 101. The port and threaded plug are aligned with the shaft axis 503 so as to permit easy access through the port to the screw 92.

To facilitate the angular positioning of the nozzle to fuel an aircraft, the nozzle must be rotatably coupled to a fuel supply hose (not shown). The nozzle may be rotatably connected to a simple threaded hose fitting or a strainer ball valve having a hose fitting at one end. Such a valve is disclosed in a copending application, Ser. No. 08/059,829, filed, May 7,1993 entitled BALL VALVE (attorney docket 25182/LTR), the disclosure of which is incorporated herein by reference. The fitting in turn is connected via a hose to the fuel supply. As shown in FIG. 1, the nozzle body is rotatably connected to a threaded hose fitting 102 via a swivel 104.

As further shown in FIGS. 1a and 6, a bearing ring comprising two annular bearing ring segments 106a and 106b encompasses the nozzle body near the inlet end. Each segment bounds an arc of slightly less than 180° about the flow axis. In the preferred embodiment, the bearing ring segments are formed of a bronze alloy. Channels 108a and 108b formed in the bearing ring segments 106a and 106b, respectively, mate with an annular lip 110, projecting outward from the housing. The annular lip secures the bearing ring segments to the nozzle body against movement along the flow axis. Socket head cap screws 112a and 112b are secured in holes 114a and 114b in the bearing ring segments 106a and 106b, respectively. The screw heads project slightly inward of the bearing rings and ride in bores 116a and 116b formed through the annular lip 110 in the nozzle body 20. The screw heads interact with the bores to secure the bearing ring segments to the nozzle body against rotation about the flow axis. An O-ring 118 rides in grooves 120a and 120b formed in bearing ring segments 106a and 106b, respectively. Bearing ring segments 106a and 106b have downstream and upstream bearing faces 122a and 122b, and 124a and 124b, respectively. The downstream and upstream bearing faces are beveled. The fitting 102 encompasses the nozzle body upstream of the bearing ring segments and has an annular shoulder 126 which slidably engages the upstream bearing faces 124a and 124b. The fitting has a rim 128 which overlaps and fits with surfaces 129a and 129b. The fitting further has an annular flange 130 projecting radially outward from the fitting. A clamp 132 having hinged segments 134a and 134b encompasses the flange 130. The clamp has a first annular shoulder 140 which slidably engages the downstream bearing faces 122a and 122b and a second annular shoulder 142 which engages the annular flange and thereby rotatably couples the fitting to the nozzle body. Pins 144a and 144b extend through the hinged segments 134a and 134b respectively (FIG. 6). The pins engage respective slots (not shown) in the annular flange 130 to fix the clamp to the flange against relative rotation about the flow axis. A hinge pin 148 hinges the two hinge segments together and a spring-loaded dual-ball locking pin 150 secures the hinge segments to each other in a closed configuration. A nitrile rubber quadring 154 seals the shoulder 140 of the clamp to the nozzle body. A nitrile rubber quadring 156 with polytetrafluoroethylene back-up rings 158 seals the fitting to the nozzle body.

The nozzle may be held via handles 160a and 160b (not shown) on shafts 162a and 162b respectively. The shafts are attached to a two-part shell 166 which encompasses the nozzle body about its downstream end. The shell has an annular shoulder 167 which faces downstream. An annular shoulder 168 formed in the nozzle body faces upstream and bears against the annular shoulder 167 of the shell. A connector 170 for connecting the nozzle to an aircraft fueling flange is attached to the shell at the downstream end of the nozzle by six screws 171. The connector has six slots 172 interspaced with six ramps 174. The connector 170 further encompasses a spring loaded lock plate 176.

As further shown in FIGS. 1 and 7, six recesses 180 are formed in a downstream rim 182 of the nozzle body. Adjacent three of the recesses 180, springs 184 extend at one end from a bore 186 formed in the nozzle body to another end which bears against the lock plate 176. In FIG. 1, for purposes of illustration, the recess 180, spring 184 and bore 186, as well as the corresponding section of the lock plate 176, are shown rotated approximately 10 degrees about the flow axis. The springs 184 bias the lock plate 176 in the downstream direction. The lock plate 176 has three radial projections 190a and three radial projections 190b which extend into the recesses 180. The projections 190a extend past the perimeter of the rim 182.

The three projections 190a of the lock plate 176 extend into three primary recesses 192 formed in the connector 170 below three ramps 174 and the adjacent slots 172. Secondary recesses 194 adjacent the slots 172 extend downstream from the primary recesses 192.

When the nozzle is not in use, the projections 190a are received by the secondary recesses 194. As the projections 190a interact with both the recesses 180 in the nozzle body rim 182 and the secondary recesses 194 in the connector 170, the connector may not be significantly rotated relative to the nozzle body. An interlock feature (not shown) on the lever interacts on the upstream rim of the shell (not shown) and a recess formed in the rim to prevent rotation of the lever toward the open position when the nozzle is disengaged from an aircraft fueling flange, thereby preventing accidental nozzle opening. When the nozzle is engaged to a fueling flange, the recess in the upstream rim accommodates rotation of the lever.

Figure 10:
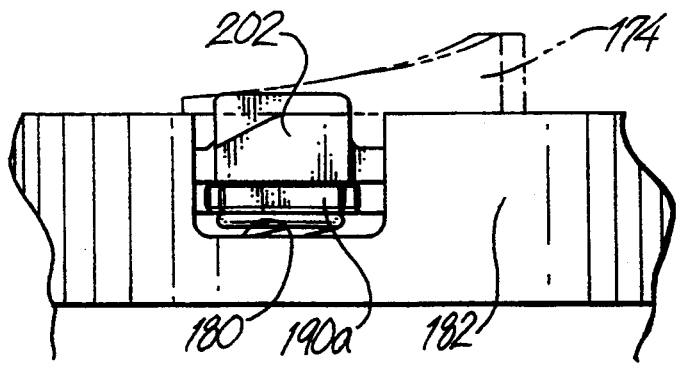
FIG. 10 is a partial side elevational view of the downstream rim and lock plate of the nozzle of FIG. 1 engaged with a lug of an aircraft fueling flange, with a connector ramp shown schematically in phantom.

To attach the nozzle to a fueling flange 200 of an aircraft, the nozzle is maneuvered into position adjacent the fueling flange (FIG. 2). The fueling flange has three radially projecting lugs 202. The fueling flange may be constructed in accordance with United States Military Standard 24484 which is hereby incorporated by reference. The slots 172 of the connector 170 are configured to receive the lugs 202 of the fueling flange, with the three lugs being received by either of two alternating sets of three of the six slots 172. The ramps are configured to guide the lugs into the slots for proper orientation of the nozzle and flange when the nozzle is brought into contact with the fueling flange. As the lugs are guided into the slots, the flange contacts the spring loaded lock plate 176. It can be seen that the lugs will equivalently align with and contact either the projections 190a or 190b of the lock plate 176. As pressure is applied between the nozzle and the flange, the lock plate is depressed into a depressed position (FIG. 10). As the lock plate is depressed, the lugs of the fueling flange pass into the recesses 180 in the downstream rim 182 of the nozzle body, thereby securing the fueling flange to the nozzle body against rotation. With the lock plate in the depressed position the projections 190a will exit the secondary recesses 194 of the connector 170. The shell may be rotated until one of the projections 190a contacts the wall 198 of the primary recess 192. When this occurs the lugs of the fueling flange are locked between the ramps 174, shown in phantom in FIG. 10, and the projections 190a or 190b of the lock plate 176. With the connector rotated into this orientation, the recess in the shell aligns with the lever shaft. The lever is then free to rotate. With the lever in the open position, the shell and connector cannot be rotated to the disconnect position.

As the poppet is opened, the nose lip contacts an annular seat (not shown) on the fueling flange, forming a seal therebetween. As the nozzle is opened further the poppet head disengages from the seal 48 and the downstream exterior surface of the poppet head comes into contact with a front surface of a spring-loaded poppet (not shown) in the fueling flange. As the nozzle is opened further the spring-loaded poppet will disengage from a seal on the fueling flange thereby allowing communication of fuel between the nozzle and the aircraft.

The advantages of a fueling nozzle according to the present invention are readily apparent. With the arm overarching the bearing sleeve, the length and thus weight and bulkiness of the nozzle are greatly reduced. As the arm is not connected directly to the stem there is no hole through the stem nor a slot formed in the stem both of which tend to reduce the stem's strength. Furthermore, none of the force needed to move the head against downstream forces, caused by fuel pressure or the wave spring, or against opposite forces, caused by engaging the poppet of an aircraft fueling flange, are transmitted through the stem. Rather, all of the force is transmitted through the arm. The above factors permit the use of a narrower stem or stem made of a lightweight material such as aluminum. Unlike the Brown nozzle, the bearing sleeve, is intact, not having a slot cut through it, and therefore offers improved strength and performance. The present nozzle additionally offers the possibility of extending the length of the bearing sleeve for improved guidance of the stem, without exacting an undue penalty in terms of nozzle length and weight.

To remove the poppet, with the poppet in the open position the threaded section 76 of the pin (FIG. 3) is easily engagable with a hex key wrench. If the pin is of a two-part design the axle section may be removed using a small punch or even a paper clip. In distinction to the prior art devices, the poppet head and stem may be removed as a unit. This permits the use of a lightweight unitary poppet constructed of aluminum.

Once the poppet is removed, it is easy to remove the seat by pulling or prying it in a downstream direction. The force applied will cause the body lip 62 to inwardly compress the O-ring 58. With enough force, the O-ring will snap over the annular lip thereby permitting removal of the seat. No retainer clip is needed and special tools are not necessarily required. Upon reassembly, there is no adjustment required for installation of the poppet as required for the Brown fueling nozzle.

To remove the linkage from the nozzle body, the threaded plug 101 is removed from the port 100 and a hex key is inserted to remove the screw 92. The arm and crank may subsequently be removed through the outlet port of the nozzle and the actuator shaft may be removed from the sleeve 90. The use of interfitting crank and shaft splines permits orientation of the crank without the need for multiple bolts.

All of the above operations may be accomplished without having access to the inlet port of the nozzle, thereby reducing the need to remove the nozzle from any hose fittings, strainer ball valves, etc. to which it is attached.

The use of a split ring bearing permits easy replacement of the bearing ring segments 106a and 106b as they become worn. To achieve this the locking pin 150 is removed from the clamp 132 and the clamp is opened. The nozzle may then be separated from the fitting 102, exposing the bearing ring segments. The O-ring 118 may be removed such as by inserting a tool between the bearing ring segments to lift the O-ring out of the grooves 120a and 120b. The bearing ring segments may be formed of a material which has a greater resistance to wear than that of the nozzle body. The clamp and the fitting may eventually become worn so as to require replacement, however, it can be seen that the nozzle body itself suffers no wear from the swivel. Accordingly, wear is isolated to relatively inexpensive and easy to replace parts.

The use of a connector having six ramps and slots reduces the effort required to attach the nozzle to a fueling flange. To guide the fueling flange lugs into the three slots of the prior art connector, a worker might have to rotate the nozzle by up to 120°. This is reduced to approximately 60° in the fueling nozzle of the present invention. This is facilitated by the use of the six recesses 180 to secure the flange against rotation as opposed to the three pins of the prior product which engage the slots 204 of the flange. Additionally, it has been observed that, in the prior product, over time the pins would wear the rim of the fueling flange so as to widen the slots. This has led to excessive rotational play between the fueling flange and the nozzle body. In the nozzle of the preset invention, the pins are not required, although they may optionally be used for a fuel selection function.

The described embodiment of the invention is only considered to be preferred and illustrative of the inventive concept; the scope of the invention is not to be restricted to such embodiment. Various and numerous other arrangements, uses of materials, and fabrication techniques may be devised by one skilled in the art without departing from the spirit and scope of this invention. Although the invention is described in context of a specific aircraft fueling nozzle, it may be utilized in conjunction with a wide variety of nozzles and other valves.

What is claimed is:

1. A nozzle comprising:
   a nozzle body having upstream and downstream ends, defining a flow axis and a downstream direction therebetween;
   a bearing sleeve mounted within the nozzle body, which sleeve has first and second ends;
   a poppet having a head and a stem connected to the head, wherein the head has a downstream surface facing away from the stem and a poppet face facing upstream and the stem has a stem axis and extends into the bearing sleeve with the first end of the bearing sleeve facing downstream toward the head;
   seat means for forming a seal with the poppet face, which seat means are mounted in the nozzle body adjacent the downstream end; and
   linkage means for moving the poppet along the stem axis,
   wherein the linkage means includes an arm rotatably coupled to the poppet for relative rotation about a coupling axis located between the downstream surface of the head and the bearing sleeve.

2. The nozzle of claim 1 further including a pivot pin located along the coupling axis for coupling the arm to the head.

3. The nozzle of claim 2 wherein the head has a pocket for receiving the arm.

4. The nozzle of claim 3 wherein the pivot pin comprises an axle section for rotatably engaging the arm and a threaded section for securing the pin to the head.

5. The nozzle of claim 4 wherein the threaded section of the pin comprises a set screw.

6. The nozzle of claim 5 wherein the coupling and stem axes are perpendicular and intersecting.

7. The nozzle of claim 1 wherein the linkage means further includes actuator means for moving the arm, which actuator means comprise:
   a shaft coupled to the nozzle body for rotation about a shaft axis transverse to the stem axis;
   a crank rotatably connected to the arm; and
   crank securing means for coupling the crank to the shaft against relative rotation about the shaft axis.

8. The nozzle of claim 7 wherein the crank securing means comprises:
   a plurality of crank splines formed on the crank for engaging a plurality of shaft splines formed on the shaft; and
   fastening means for maintaining engagement between the crank splines and the shaft splines.

9. The nozzle of claim 8 wherein the fastening means comprises a screw extending through the crank and into the shaft.

10. The nozzle of claim 9 wherein the screw extends into the shaft along the shaft axis and there are two crank splines and two shaft splines which are disposed about the shaft axis.

11. The nozzle of claim 10 wherein the shaft extends through the nozzle body wall and is connected to a lever for rotating the shaft about the shaft axis.

12. A nozzle comprising:
   a nozzle body having upstream and downstream ends;
   a bearing sleeve mounted within the nozzle body, which sleeve has downstream and upstream ends;
   a poppet having a head and a stem connected to the head, wherein the head has a downstream surface facing away from the stem, and a poppet face substantially facing upstream and the stem has a stem axis and extends into the bearing sleeve;
   linkage means for moving the poppet along the stem axis;
   seat means for forming a seal with the poppet face of the head, which seat means are mounted in the nozzle body adjacent the outlet end and are movable along an upstream downstream axis;
   spring means for biasing the seat means toward the head; and
   retention means for limiting movement of the seat means toward the head,
   wherein the retention means comprise an annular seat lip on the seat means which cooperates with an annular body lip on the nozzle body and the body lip is located downstream of the seat lip.

13. The nozzle of claim 12 wherein the seat lip comprises an O-ring projecting outward from the seat and the body lip projects inward from the nozzle body.

14. A nozzle comprising:
   a nozzle body having upstream and downstream ends;
   a bearing sleeve mounted within the nozzle body, which sleeve has downstream and upstream ends;
   a poppet having a head and a stem connected to the head, wherein the head has a downstream surface facing away from the stem, and a poppet face substantially facing upstream and the stem has a stem axis and extends into the bearing sleeve;
   linkage means for moving the poppet along the stem axis;
   seat means for forming a seal with the poppet face;
   wherein the linkage means comprises:
   an arm coupled to the poppet;
   a crank rotatably connected to the arm;
   a shaft coupled to the nozzle body for rotation about a shaft axis transverse to the stem axis; and
   crank securing means for coupling the crank to the shaft against relative rotation about the shaft axis;
   a plurality of crank splines formed on the crank;
   a plurality of shaft splines formed on the shaft for engaging the crank splines; and
   a screw extending through the crank and into the shaft for maintaining engagement between the crank splines and the shaft splines.

15. A fluid control valve comprising:
   a valve body having a passage arranged along a flow axis for fluid flow from upstream to downstream;
   a valve stem aligned with the flow axis in the passage for movement along the flow axis;
   means connected to the valve body for guiding the movement of the valve stem along the flow axis;
   a valve head aligned with the flow axis at one end of the guiding means;
   means for connecting the valve head to one end of the valve stem so the valve head is movable along the flow axis between a closed position that blocks the passage and an open position that unblocks the passage;

a rotatable valve actuator at the other end of the guiding means, the actuator being rotatable about an actuating axis;

a crank arm overarching the guiding means from the valve head to the actuator;

means for rotatably connecting one end of the crank arm to the valve head for relative rotation about a connection axis; and means for rotatably connecting the other end of the crank arm to the actuator off-center of the actuating axis to rotate and translate the crank arm as the actuator rotates.

16. The control valve of claim 15, in which the connection axis is perpendicular to and intersects the flow axis.

17. The control valve of claim 16, in which the actuating axis is perpendicular to the flow axis.

18. The control valve of claim 15, in which the passage has a downstream outlet, the valve head is at the downstream end of the guiding means, the actuator is at the upstream end of the guiding means, the valve head is connected to the downstream end of the valve stem, and the valve head opens the outlet to unblock the passage and closes the outlet to block the passage.

19. The control valve of claim 15, in which the passage has an inlet port, an outlet port, a wide section between the inlet port and the outlet port, the valve head opens one of the ports to unblock the passage and closes the one port to block the passage, and the actuator is located in the wide section so the other end of the crank arm has clearance when it rotates away from the flow axis.

20. The control valve of claim 15, in which the actuating axis is perpendicular to the flow axis, the means for rotatably connecting is upstream from the end of the valve stem and the actuating axis when the valve head is in the closed position, and the means for rotatably connecting is nearer to the end of the valve stem and downstream of the actuating axis when the valve head is in the open position.

* * * * *